(12) United States Patent
McRobert

(10) Patent No.: US 7,396,068 B1
(45) Date of Patent: Jul. 8, 2008

(54) METHOD AND APPARATUS FOR ATTACHING A DOOR TO A PASSENGER VEHICLE

(76) Inventor: Eric L. McRobert, 905 Campbell Dr., Belpre, OH (US) 45714

( * ) Notice: Subject to any disclaimer, the term of this patent is extended or adjusted under 35 U.S.C. 154(b) by 0 days.

(21) Appl. No.: 11/369,097

(22) Filed: Mar. 6, 2006

Related U.S. Application Data

(63) Continuation-in-part of application No. 10/719,380, filed on Nov. 21, 2003, now abandoned.

(60) Provisional application No. 60/429,852, filed on Nov. 26, 2002.

(51) Int. Cl.
*B60J 5/00* (2006.01)

(52) U.S. Cl. .................. 296/146.12; 49/192; 49/247; 49/248; 16/368

(58) Field of Classification Search ............ 296/146.11, 296/146.12, 51; 49/192, 246–248; 16/367–369
See application file for complete search history.

(56) References Cited

U.S. PATENT DOCUMENTS

| | | | | |
|---|---|---|---|---|
| 3,589,069 A | * | 6/1971 | Lecomte ................ 49/257 |
| 6,030,025 A | * | 2/2000 | Kanerva ................ 296/146.12 |
| 6,086,137 A | * | 7/2000 | Leschke et al. .......... 296/146.1 |
| 6,808,223 B1 | * | 10/2004 | Baum et al. ............ 296/146.12 |
| 6,820,918 B1 | * | 11/2004 | DeBono ................ 296/146.11 |
| 6,845,547 B2 | * | 1/2005 | Ham ........................... 16/374 |
| 7,100,245 B2 | * | 9/2006 | Wohlfarth .................... 16/367 |
| 7,140,075 B2 | * | 11/2006 | Ham ........................... 16/374 |
| 7,210,200 B2 | * | 5/2007 | Hoffman ..................... 16/367 |
| 2004/0187263 A1 | * | 9/2004 | Hoffman ..................... 16/367 |
| 2005/0285429 A1 | * | 12/2005 | Valois .................... 296/146.11 |
| 2006/0249971 A1 | * | 11/2006 | Ichinose ..................... 296/51 |
| 2007/0013208 A1 | * | 1/2007 | Krumholz ............. 296/146.12 |
| 2007/0145774 A1 | * | 6/2007 | Plavetich et al. ....... 296/146.11 |

* cited by examiner

*Primary Examiner*—Dennis H Pedder
(74) *Attorney, Agent, or Firm*—Steptoe & Johnson PLLC

(57) ABSTRACT

An apparatus for attaching a door to a passenger vehicle body having a lift arm and a hinge assembly. The lift arm rotatably connects the door to the vehicle body. The lift arm imparts upward rotational movement to the door relative to the vehicle body as upward pressure is applied to the arm. The hinge assembly allows the door to open horizontally about a pair of hinges connected to the hinge assembly. A stop pin assembly dictates whether the door can be opened vertically or horizontally.

1 Claim, 5 Drawing Sheets

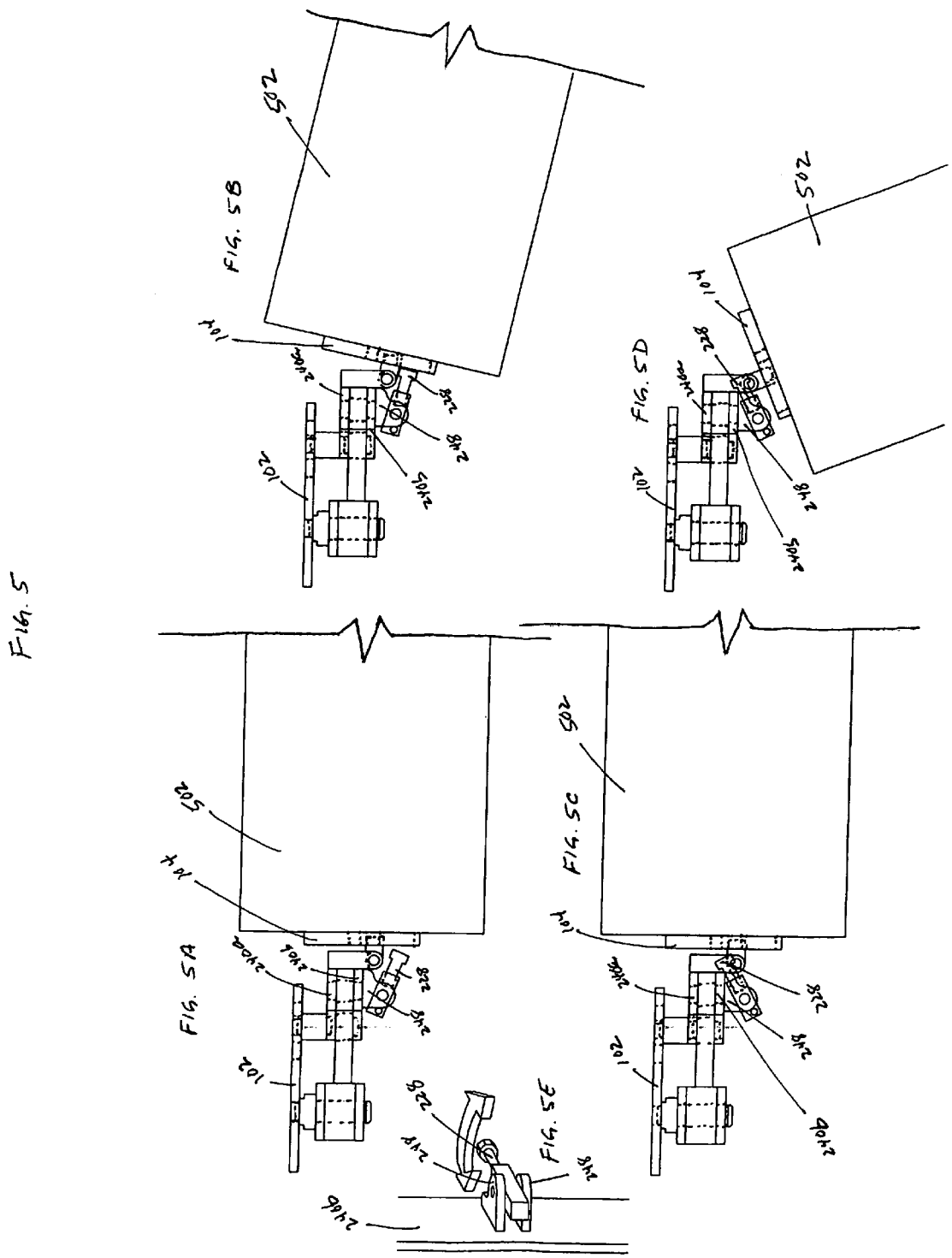

METHOD AND APPARATUS FOR ATTACHING A DOOR TO A PASSENGER VEHICLE

CROSS REFERENCE TO RELATED APPLICATIONS

This is a continuation-in-part of U.S. application Ser. No. 10/719,380 filed Nov. 21, 2003 now abandoned, which claims priority to U.S. provisional application No. 60/429,852 filed Nov. 26, 2002.

BACKGROUND OF THE INVENTION

1. Field of the Invention

This invention relates to passenger vehicles, and more particularly to an apparatus for attaching a door to a passenger vehicle.

2. Related Art

Mechanisms for suspending vehicle car doors typically include simple, conventional hinges which have been modified to some extent and which usually are mounted in the side of the forward door opening, and in the forward door edge, respectively. The opening and closing movements of the door are caused by the door leaf pivoting about a common hinge axis. As the door is opened, the rear edge of the door will swing out from the side of the car, whereby a space for stepping-in and stepping-out is formed between the rear door edge and the car body. In order to give a reasonable space, guaranteeing fairly free stepping-in and stepping-out, it is required that the door is opened so much that its rear edge is situated at least about 60 cm outside the side of the car body.

It often is difficult to open a car door so much as required for comfortable stepping-in and stepping-out due to different obstacles, such as other cars parked close by in narrow parking lots, walls or pillars in small garages, etc.

As an alternative to these conventional door hinges for passenger cars, which thus in the open door position still limit the size of the stepping-in and stepping-out opening, and furthermore require rather big free space along the sides of the car, there are sliding doors of different types, which are used successfully in light transport cars and miniature buses. However, this opening mechanism is hardly useful for passenger cars, as the mounting of the sliding mechanism and the reciprocating movement of the door leaf are obstructed by the front wheel of the vehicle. For using sliding door leafs it therefore is necessary to let the motion area of the door leaf extend rearwards, and for this reason sliding doors for passenger cars will limit the car to two door models—a limitation not popular with many. Furthermore, it is still difficult to find natural mounting attachments for the sliding mechanisms and it is necessary to design more or less complicated solutions, which mean increased manufacturing costs and, more importantly, often results in unstable doors.

Another alternative for the common car door hinges is a mechanism which uses pivotable arms, e.g., often used on buses. In such applications for passenger cars, the position of the front wheels will limit the usefulness, as well as the movement of the door. These structures thus do not provide any real solution to the problem.

U.S. Pat. No. 6,086,137 naming as inventor Leschke et al. teaches a side door of a passenger vehicle, which for opening purposes, following a sideways movement which moves the side door out of the door aperture, is actuated by auxiliary forces to pivot forwards and upwards around a horizontally aligned, bodywork-mounted bearing point. Leschke et al. does not, however, teach a side door that can be selectively opened either horizontally or vertically during normal operation. Instead, the side door in Leschke et al. only can be opened horizontally during emergency use by removing a pin out of a bearing journal thereby permitting the door temporarily to open horizontally. Thus, there remains a need in the art for an apparatus for attaching a side door to a passenger vehicle that will permit the door to be opened selectively during normal operation either horizontally or vertically.

SUMMARY OF THE INVENTION

The present invention solves the foregoing problems by providing a method and apparatus for selectively opening a side door to a passenger vehicle during normal operation either in a conventional manner, i.e., horizontally, or in an essentially vertical manner.

One aspect of the invention is an apparatus for attaching a door to a passenger vehicle body, including a lift arm rotatably connecting the door to the vehicle body, such that the lift arm imparts upward rotational movement to the door relative to the vehicle body as upward pressure is applied to the lift arm.

Another aspect of the invention is an apparatus for attaching a door to a passenger vehicle body, including a lift plate, a door plate, and a lift arm rotatably connected to the lift plate and extending between the lift plate and the door plate, wherein the lift arm imparts upward rotational movement to the door relative to the vehicle body as upward pressure is applied to the lift arm.

Another aspect of the invention is a method of opening a door connected to a passenger vehicle body, including the steps of rotating a stop pin assembly to a predetermined position depending upon whether the door is to be opened horizontally or vertically, opening the door slightly horizontally, and depending upon the positioning of the stop pin assembly, either applying outwards pressure to a trailing edge of the door such that the door continues to open horizontally by pivoting about a hinge assembly, or applying upwards pressure to the door such that the door opens vertically as a result of a lift arm imparting upward rotational movement to the door relative to the vehicle body.

Another aspect of the invention is an apparatus for connecting a door to a passenger vehicle having a body, including an assembly that selectively opens the side door during normal operation either horizontally or vertically.

A feature of the invention is a lift arm rotatably mounted to the vehicle body, wherein the lift arm opens the door vertically relative to the vehicle body.

Another feature of the invention is a hinge assembly that opens the door horizontally about a common hinge axis.

Another feature of the invention is a door stop assembly that, depending upon its positioning, determines whether a vehicle door opens vertically about the lift arm or horizontally about the hinge assembly.

Another feature of the invention is a shock connected to and extending from a lift arm to apply upward force to a vertically opening vehicle door.

Another feature of the invention is a pivot guide that maintains the lift arm in a proper plane as a vertically-opened door is being closed. The pivot guide thus prevents the door from dropping down beyond the vehicle door opening as a result of the door being lowered off-plane.

An advantage of the invention is that the vehicle body need not be modified in order to attach a door to the vehicle body using the apparatus of the present invention.

Another advantage of the invention is that it is mounted using OEM bolts and bolt holes.

Another advantage of the invention is that, once installed, the car doors may selectively be opened either conventionally, i.e., horizontally, or vertically.

Another advantage of the invention is that the car doors may be opened vertically in tight spaces where horizontal movement of the door is either not possible or is very limited.

Another advantage of the invention is that it enhances the aesthetic appearance of a vehicle when the doors are in the vertically opened position.

Another advantage of the invention is that minimal physical exertion is required to open the car door vertically because one or more shocks applies upward pressure to the car door once the car door is opened slightly horizontally.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 5A is a planar rear view of an embodiment of the invention attached to a car door in which the stop pin assembly is rotated to a first position away from the hinge stabilizer bars;

FIG. 5B is a planar rear view of an embodiment of the invention attached to a car door in which the stop pin assembly limits the horizontal rotation of the car door as it is opened;

FIG. 5C is a planar rear view of an embodiment of the invention attached to a car door in which the stop pin assembly is rotated to a second position toward the hinge stabilizer bars;

FIG. 5D is a planar rear view of an embodiment of the invention attached to a car door in which the stop pin assembly allows maximum rotation of the car door about the hinges; and FIG. 5E is a perspective view of the rotatability of the stop pin assembly in relation to a hinge stabilizer bar.

EMBODIMENTS OF THE INVENTION

Referring to FIGS. 1-5, an apparatus for attaching a door to a passenger vehicle according to an embodiment of the present invention is identified generally at reference number 100. The apparatus 100 preferably is adapted for use with land vehicles, and more specifically with passenger vehicles. Non-limiting examples of passenger vehicles include the: Mitsubishi 3000, Dodge Stealth, Honda Civic, Mitsubishi Eclipse, Eagle Talon, and Chevrolet Cavalier. The apparatus 100 also may be adapted for use with other land vehicles without departing from the intended scope of this invention. For convenience purposes only, the invention is described as adapted for use with a passenger vehicle.

Figure 1:
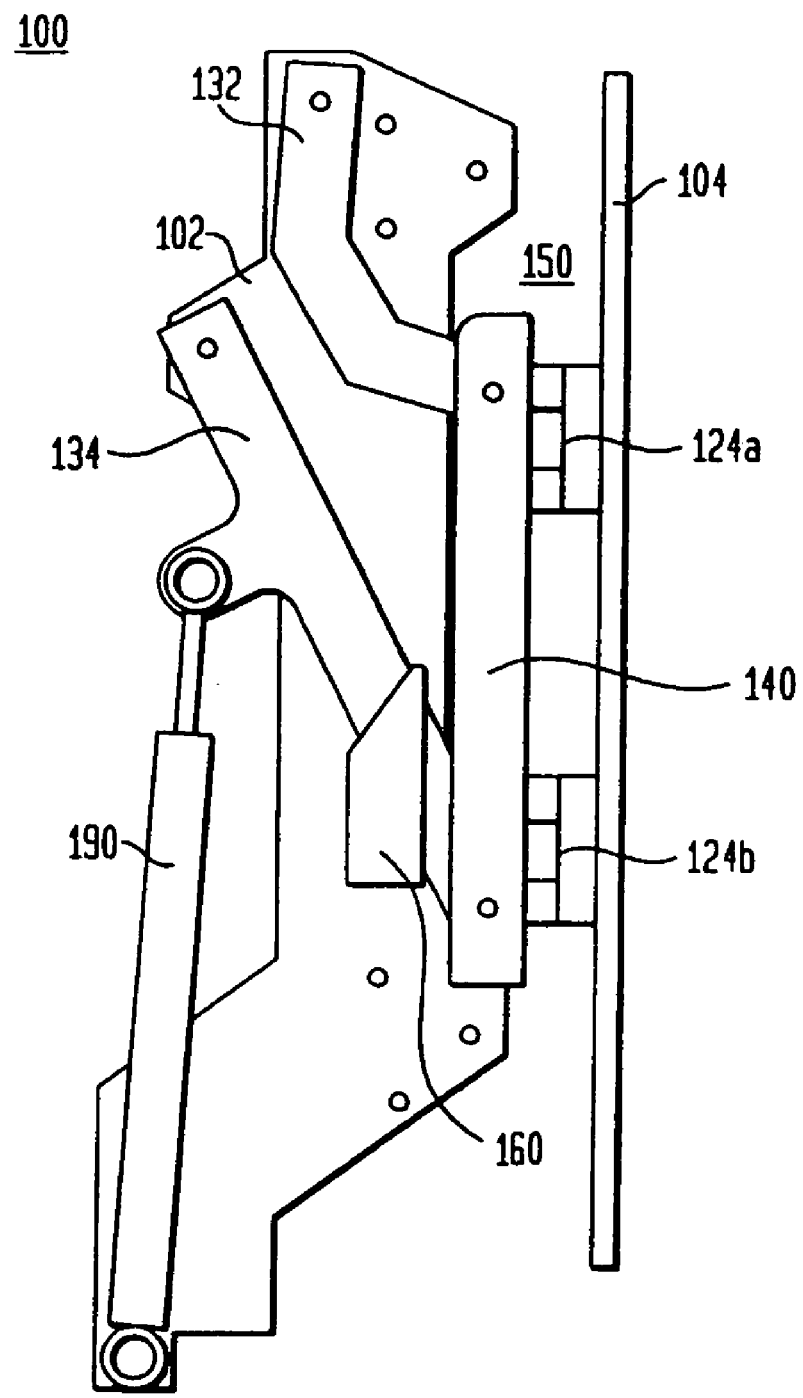
FIG. 1 is a planar front view of an embodiment of the present invention.

FIG. 1 shows a front planar view of an embodiment of the apparatus 100 of the present invention. The apparatus 100 can include an arm for opening and closing a vehicle door vertically relative to the vehicle body. In a preferred embodiment, the apparatus 100 includes at least one, and preferably two, lift arms 132 and 134. Providing two separate lift arms is not a requirement of the invention, but is convenient in many preferred embodiments because the distance between the lift arms 132 and 134 helps to stabilize the vehicle door as it rotates through a vertical arc. One or more shocks 190 can be connected to one or both of the lift arms 132 and 134 to apply upward force to the door, thereby helping to rotate the door through its vertical arc. Alternate means for applying upward force to the lift arms 132 and 134, other than a shock 190, also can be used. Non-limiting examples of means for applying upward force to the lift arms 132 and 134 include pneumatics, springs, hydraulics, magnets, and electric actuators.

Preferably, each of the two lift arms 132 and 134 is connected to the vehicle body by a lift plate 102. The lift plate 102 has a pivot guide 160 extending from its forward-facing surface to guide lift arm 132 in a desired plane relative to the lift plate 102 as the vehicle door is being closed. The shock 190 preferably connects to the lift plate 102 and extends to the lift arm 134.

While the lift arms 132 and 134 allow the vehicle door to open vertically, the apparatus 100 can include a hinge assembly 150 which allows the door to open in its OEM-intended manner, i.e., horizontally. In a preferred embodiment, the door opens horizontally about the hinge assembly 150 to a fully-opened position as outward pressure is applied to a trailing edge of the door. "Fully-opened" means a position equal to, or just slightly less than (about 5% to about 10% less than), the fully-opened position attained when using the OEM hinges. For example, whereas a door using OEM hinges might open about 60 degrees, a door using the apparatus 100 of this invention might open about 54 degrees to about 60 degrees. As a result, the apparatus 100 not only allows ingress and egress through a vertically-opened door, but it also allows easy ingress and egress through a horizontally-opened door.

Hinge assembly 150 includes hinge stabilizer 140 and hinges 124a and 124b. The lower ends of the lift arms 132 and 134 extend through one side of the hinge stabilizer 140 and are secured therein. The hinges 124a and 124b are connected to the hinge stabilizer 140 on the side opposite the one through which the lift arms 132 and 134 extend. The hinge assembly 150 can be connected to the vehicle door by a door plate 104. The door plate 104 preferably is connected to the leading edge of the vehicle door. The hinges 124a and 124b in the hinge assembly 150 are connected to the door plate 104.

Lift Arm

Figure 2:
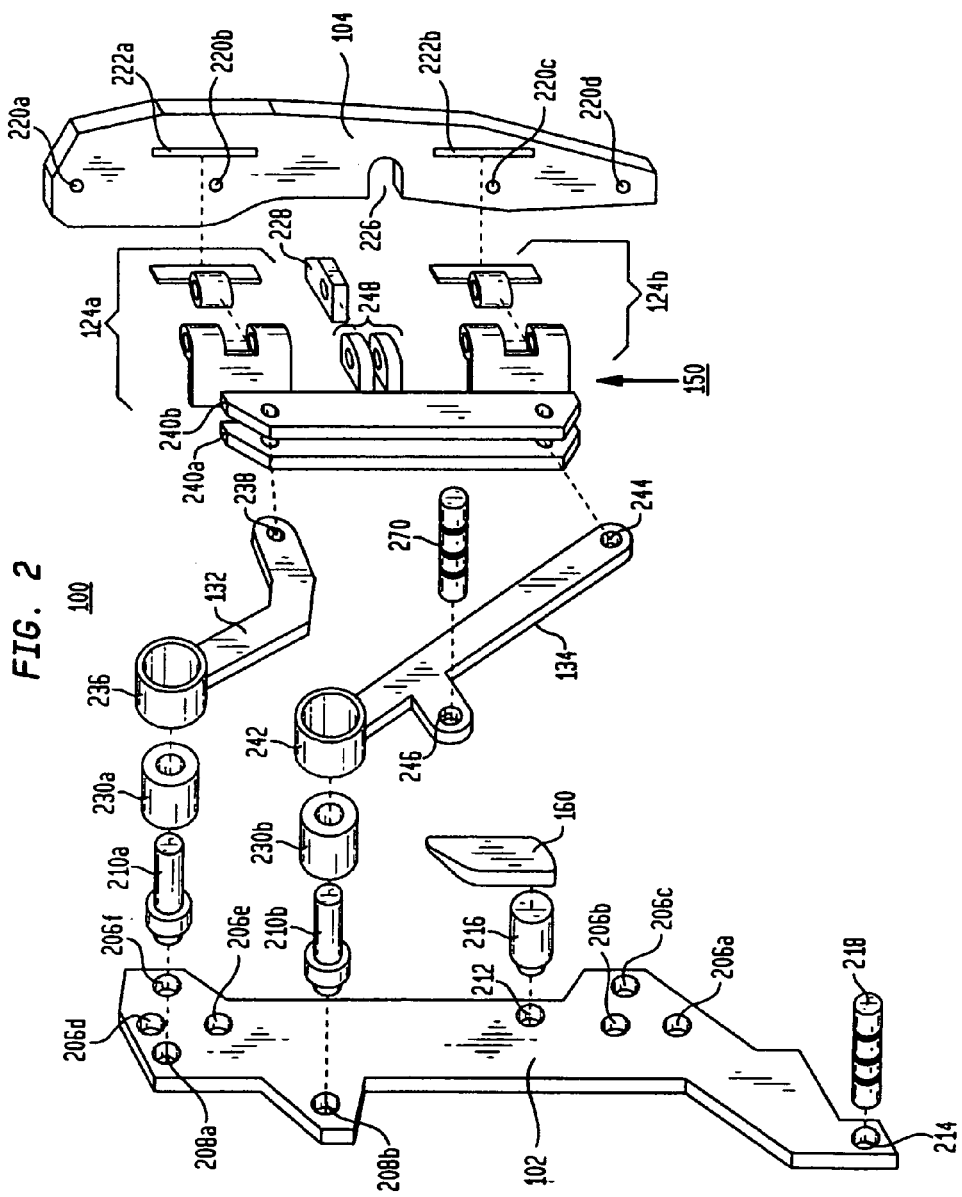
FIG. 2 is an exploded perspective view of the invention.

FIG. 2 shows an exploded perspective view of an embodiment of the apparatus 100 of the present invention. Lift arms 132 and 134 can be rotatably connected to the lift plate 102 by pivot pins 210a and 210b and bearings 230a and 230b. In a presently preferred embodiment, lift arm 132 is generally reverse-"J" shaped and has a top end, a body, and a bottom end. The shape of the lift arm 132 can be modified, however, depending upon the make and model of vehicle on which the apparatus 100 is to be installed.

A generally circular bearing receiving member 236 with a central opening is situated atop the top end of the lift arm 132. Bearing receiving member 236 preferably is welded to the top end of the lift arm 132, but alternatively may be formed as a contiguous part of the lift arm 132. Lift arm 132 includes a hole 238 at its bottom end for securing lift arm 132 to hinge stabilizers 240a and 240b.

In addition to upper arm 132, the apparatus 100 optionally but preferably includes a second arm referred to as lift arm 134. Lift arm 134 has a top end, a body, and a bottom end. The shape of lift arm 134, like that of lift arm 132, can be modified depending upon the make and model of vehicle on which the apparatus 100 is to be installed. A generally circular bearing receiving member 242 with a central opening is situated atop the top end of lift arm 134. Bearing receiving member 242 preferably is welded to the top end of the lift arm 134, but alternatively can be formed as a contiguous part of lift arm 134. Lift arm 134 includes a hole 244 at its bottom end for securing lift arm 134 to hinge stabilizers 240a and 240b. Lift arm 134 also includes a shock pin receiving hole 246 for receiving upper shock pin 270.

Lift Plate

The lift plate 102 preferably is connected to a vehicle underneath the fender and between the door opening and the wheel well. The lift plate 102 can have various shapes depending upon the space requirements presented by different vehicles. The lift plate 102 preferably has a bolt hole pattern, including installation holes 206a-f, that aligns with the vehicle manufacturer's OEM bolt holes used for mounting the OEM door hinge assembly. As a result, the lift plate 102 can be mounted to the vehicle body using only the OEM bolts and bolt holes. The location of installation holes 206a-f, like the shape of the lift plate 102, can vary depending upon the vehicle to which the apparatus 100 is to be mounted. Advantageously, the lift plate 102 can be mounted to the vehicle without modifying the vehicle body by cutting, drilling, etc.

As will be apparent to those skilled in the art, many materials can be used for the purpose of making the lift plate 102. In one presently preferred embodiment, steel is considered particularly suitable. The lift plate 102 can have a thickness of about 0.125 inch to about 0.750 inch, and preferably about 0.25 inch to about 0.50 inch.

As discussed above, a shock 190 (not shown in FIG. 2) can be mounted to the lift plate 102 and extended to and mounted to the lift arm 134. The bottom section of the lift plate 102 preferably includes a pin 218 for receiving a bottom portion of the shock 190. The pin 218 can be welded to a flat surface on the lift plate 102, or it can be inserted first into a hole, such as hole 214, and then can be secured by welding or other means apparent to those skilled in the art.

Pivot pins 210a and 210b each can be welded to a flat surface on the lift plate 102, or each can be inserted first into a hole, such as holes 208a and 208b, and then can be secured by welding or other means known to those having skill in the art.

Pivot guide 160 can be secured to the lift plate 102 by welding the shaft 216 of the pivot guide 160 to a flat surface on the lift plate 102. Alternatively, the shaft 216 can be inserted first into stop pin hole 212 and then can be secured to the lift plate 102 by welding or other means known to those having skill in the art. Providing holes 214, 208a and 208b, and 212 is not a requirement of the invention, but is convenient in many preferred embodiments because the holes help to secure the corresponding pin 218, pivot pins 210a and 210b, and pivot guide 160 to the lift plate 102.

Bearings 230a and 230b are generally circular and have central openings extending along their respective lengths. Bearings 230a and 230b can be connected to the lift plate 102 by mounting the bearings 230a and 230b on pivot pins 210a and 210b, respectively. The preferred bearings 230a and 230b are ball bearings with an outside diameter of between about 1.25 inches and about 1.50 inches and an inside diameter of between about 0.25 inch and 0.75 inch. The most preferred outside diameter is about 1.375 inches. The most preferred inside diameter is about 0.675 inch.

Hinge Assembly

The hinge assembly 150 includes hinge stabilizer bars 240a and 240b which extend generally parallel to one another with a gap extending longitudinally therebetween. The longitudinal gap between the hinge stabilizer bars 240a and 240b allows the lower portions of the lift arms 132 and 134 to be inserted between, and secured to, the hinge stabilizer bars 240a and 240b. While the lift arms 132 and 134 are inserted between the hinge stabilizer bars 240a and 240b on one side (the left side in FIG. 2), at least one, and preferably two, hinges 124a and 124b are connected to the other side of the hinge stabilizer bars 240a and 240b. The hinges 124a and 124b can be connected to the hinge stabilizers 240a and 240b by securing a flat surface of a first section of each of the hinges 124a and 124b across the hinge stabilizer bars 240a and 240b as well as the gap extending longitudinally therebetween. The arrangement of the hinges 124 and 124b, lift arms 132 and 134, and hinge stabilizer 140, maintains the generally parallel relationship of hinge stabilizer bar 240a to hinge stabilizer bar 240b.

The second section of each of hinges 124a and 124b is connected to door plate 104. The arrangement of the hinges 124a and 124b, in relation to the door plate 104 and hinge assembly 150 allows the door plate 104 to rotate about hinge assembly 150 via the hinges 124a and 124b. In order to control the rotation of the door plate 104 about hinges 124a and 124b, a stop pin assembly 228 can be used. The stop pin assembly 228 can be rotatably connected to the hinge stabilizer bars 240a,b by pivotally connecting the stop pin assembly 228 to a stop pin assembly connector 248 such that rotation of the stop pin assembly 228 to a first position allows the door plate 104, and consequently the door, a full range of rotation about hinges 124a and 124b. In contrast, the degree of rotation of the door plate 104, and again the door, can be limited by rotating the stop pin assembly 228 to a second position. It likewise should be understood that varying degrees of rotation of the door plate 104 about the hinges 124a and 124b can be permitted by placing the stop pin assembly 228 in intermediate positions along the continuum between the first and second positions mentioned above. The stop pin assembly connector 248 preferably is connected to hinge stabilizer bar 240b and the stop pin assembly 228 is rotatably connected to the stop pin assembly connector 248.

Door Plate

The door plate 104 is connected to the vehicle door on the relatively flat leading edge of the door. The door plate 104 can take on various shapes depending upon the space requirement presented by different doors. The door plate 104 preferably has a bolt hole pattern, including installation holes 220a-d, that aligns with the vehicle manufacturer's OEM bolt holes used for mounting the OEM door hinge assembly. As a result, the door plate 104 can be mounted to the vehicle door using only the OEM bolts and bolt holes. The location of installation holes 220a-d, like the shape of the door plate 104, can vary depending upon the shape and size of the door to which the door plate 104 is to be mounted. Advantageously, the door plate 104 can be mounted to the vehicle door without modifying the door by cutting, drilling, etc.

As will be apparent to those skilled in the art, many materials can be used for the purpose of making the door plate 104. In one presently preferred embodiment, steel is considered particularly suitable. The door plate 104 can have a thickness of about 0.125 inch to about 0.750 inch, and preferably about 0.25 to about 0.50 inch.

As discussed above, hinges 124a and 124b can be mounted to the door plate 104. The door plate 104 preferably includes slots 222a and 222b for receiving hinges 124a and 124b, respectively. Door plate 104 also can have a cut-out, or notch 126, to accommodate the stop pin assembly 228.

Shock

Preferably, the apparatus 100 has one shock 190, but alternatively can have numerous shocks working together to raise the door through a vertical arc. The preferred shock is a gas shock that exerts between about 300 p.s.i. and about 500 p.s.i. The most preferred shock is a nitrogen gas shock commercially available from Ace Controls as manufacturer's number L2L2B45-153-399-001/1824N that exerts about 400 p.s.i. of pressure.

Method of Making the Apparatus for Attaching a Door to a Passenger Vehicle

The apparatus 100 of the present invention can be made by cutting, preferably by laser-cutting, a lift plate 102 and a door plate 104 from one or more sheets of metal. The lift plate 102 and door plate 104 can be cut in various shapes and sizes depending upon the vehicle to which the apparatus 100 is to be mounted. A bolt hole pattern, including installation holes 206a-f, that aligns with the vehicle manufacturer's OEM bolt holes used for mounting the OEM door hinge assembly is made in the lift plate 102. The installation holes 206a-f preferably are made by machining but may be made by alternate means apparent to those skilled in the art, such as, for example, by stamping, drilling, etc.

A pin 218 is connected to the lift plate 102, preferably at or near the bottom section of the lift plate 102. The pin 218 can be welded to a flat surface on the lift plate 102, or it can be inserted first into a hole, such as hole 214, and then can be secured by welding or other means known to those skilled in the art. Hole 214 can be formed by drilling, stamping, machining, etc. Pin 218 is capable of receiving a bottom portion of a shock 190.

Pivot pins 210 and 210b are connected at or near the top section of the lift plate 102. Pivot pins 210a and 210b each can be welded to a flat surface on the lift plate 102, or each can be inserted first into a hole, such as holes 208a and 208b, and then can be secured by welding or other means known to those skilled in the art. Holes 208a and 208b can be formed by drilling, stamping, machining, etc.

Pivot guide 160 can be secured to the lift plate 102 by welding the shaft 216 of the pivot guide 160 to a flat surface on the lift plate 102. Preferably, the shaft 216 is inserted first into stop pin hole 212 and then is further secured to the lift plate 102 by welding or other means known to those skilled in the art. Stop pin hole 212 can be formed by drilling, stamping, machining, etc.

Bearings 230a and 230b are connected to the lift plate 102 by placing the pivot pins 210a and 210b through the central openings in the bearings 230a and 230b, respectively.

The upper ends of the lift arms 132 and 134 are rotatably secured to the lift plate 102 by inserting the bearings 230a and 230b in the bearing receiving members 236 and 242, respectively. A bushing 302 can be placed over top the bearing receiving members 236 and 242 to help insure that the lift arms 132 and 134 rotate synchronously.

Upper shock pin 270 can be secured to the lift arm 134 by welding the pin 270 directly to a flat surface on the lift arm 134. Preferably, the pin 270 is inserted first into upper shock pin hole 246 and then is further secured to the lift arm 134 by welding or other means known to those skilled in the art. Upper shock pin hole 246 can be formed by drilling, stamping, machining, etc. Upper shock pin 270 is capable of receiving a top portion of a shock 190.

The lower ends of the lift arms 132 and 134 are connected, preferably fixedly, to the hinge assembly 150. The lower end of each of the lift arms 132 and 134 is inserted between the hinge stabilizer bars 240a and 240b. A pin (not shown) is placed through each of the holes 238 and 244 in the lift arms 132 and 134, respectively, which align with holes in the hinge stabilizer bars 240a and 240b. The lower ends of the lift arms 132 and 134 can be further secured by welding the pins (not shown) in place.

The hinge assembly 150 is connected to the door plate 104 by the hinges 124a and 124b. The hinges 124a and 124b are connected to the hinge stabilizer bars 240a,b by securing a flat surface of a first section of each of the hinges 124a and 124b across the hinge stabilizer bars 240a and 240b as well as the gap extending longitudinally between the hinge stabilizer bars 240a and 240b. Preferably, the hinges 124a and 124b are secured to the hinge stabilizer bars 240a and 240b by welding, but the hinges 124a and 124b can be connected to the hinge stabilizer bars 240a and 240b by alternate means known to those skilled in the art. A second, middle, section of each of the hinges 124a and 124b is secured to the door plate 104 preferably by inserting a tab on the middle section of the hinges 124a and 124b into slots 222a and 222b in the door plate 104. As will be apparent to those skilled in the art, the slots 222a and 224b can be made by various means such as machining, stamping, etc. The first and second (middle) sections of the hinges 124a and 124b are pivotally secured to one another by inserting a pin (not shown) through a central opening extending between the first and second sections of the hinges 124a and 124b. The second sections of the hinges 124a and 124b can be further secured to the door plate 104 by welding or other means known to those skilled in the art.

The door plate 104 includes, in addition to slots 222a and 222b, a bolt hole pattern including installation holes 220a-d. Preferably, installation holes 220a-d align with the vehicle manufacturer's OEM bolt holes used for mounting the OEM door hinge assembly. The installation holes 220a-d preferably are made by machining but may be made by alternate means apparent to those skilled in the art, such as, for example, by stamping, drilling, etc.

A shock 190 is mounted to the apparatus 100 by connecting a lower end of the shock 190 to pin 218 which is secured to the lift plate 102, and by connecting an upper end of the shock 190 to upper shock pin 270 which is secured to the lift arm 134.

Method of Using the Apparatus for Attaching a Door to a Passenger Vehicle

In operation, the apparatus 100 of the present invention can be used to attach a door to a passenger vehicle by connecting the lift plate 102 to the vehicle body and the door plate 104 to the vehicle door. Preferably, the lift plate 102 is attached to the vehicle under the fender in front of the door opening and behind the wheel well. The lift plate 102 is attached to the vehicle body by aligning holes 206a-f with the OEM bolt holes and securing the lift plate 102 with the OEM bolts (after removing the OEM hinge assembly). The door plate 104 is attached to the leading edge of the vehicle door by similar means, i.e., aligning holes 220a-d with the OEM bolt holes in the door and securing the door plate 104 with the OEM bolts.

Figure 3:
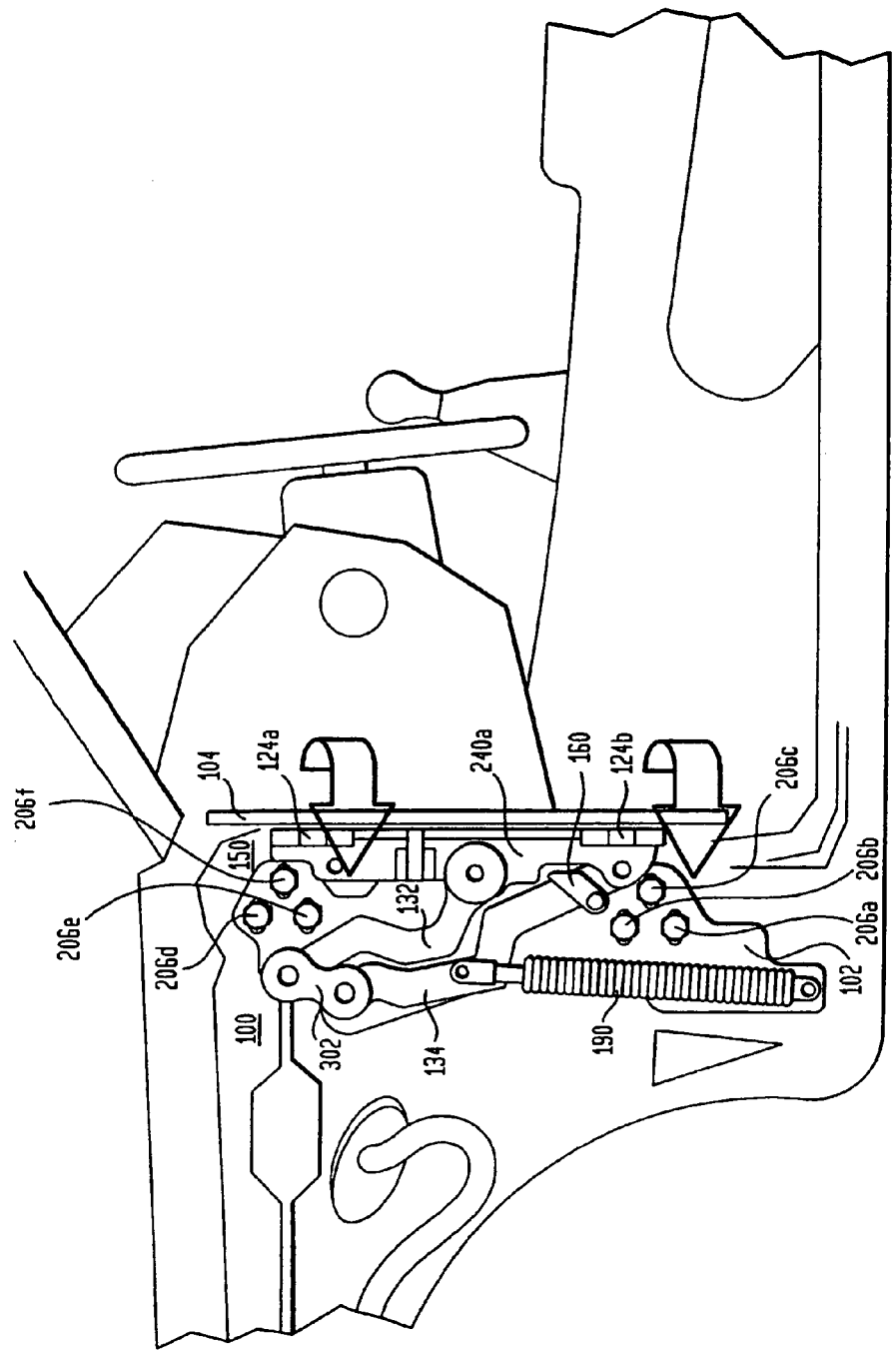
FIG. 3 is a planar front view of the invention in relation to a passenger vehicle when the side door is in a closed position.
Figure 4:
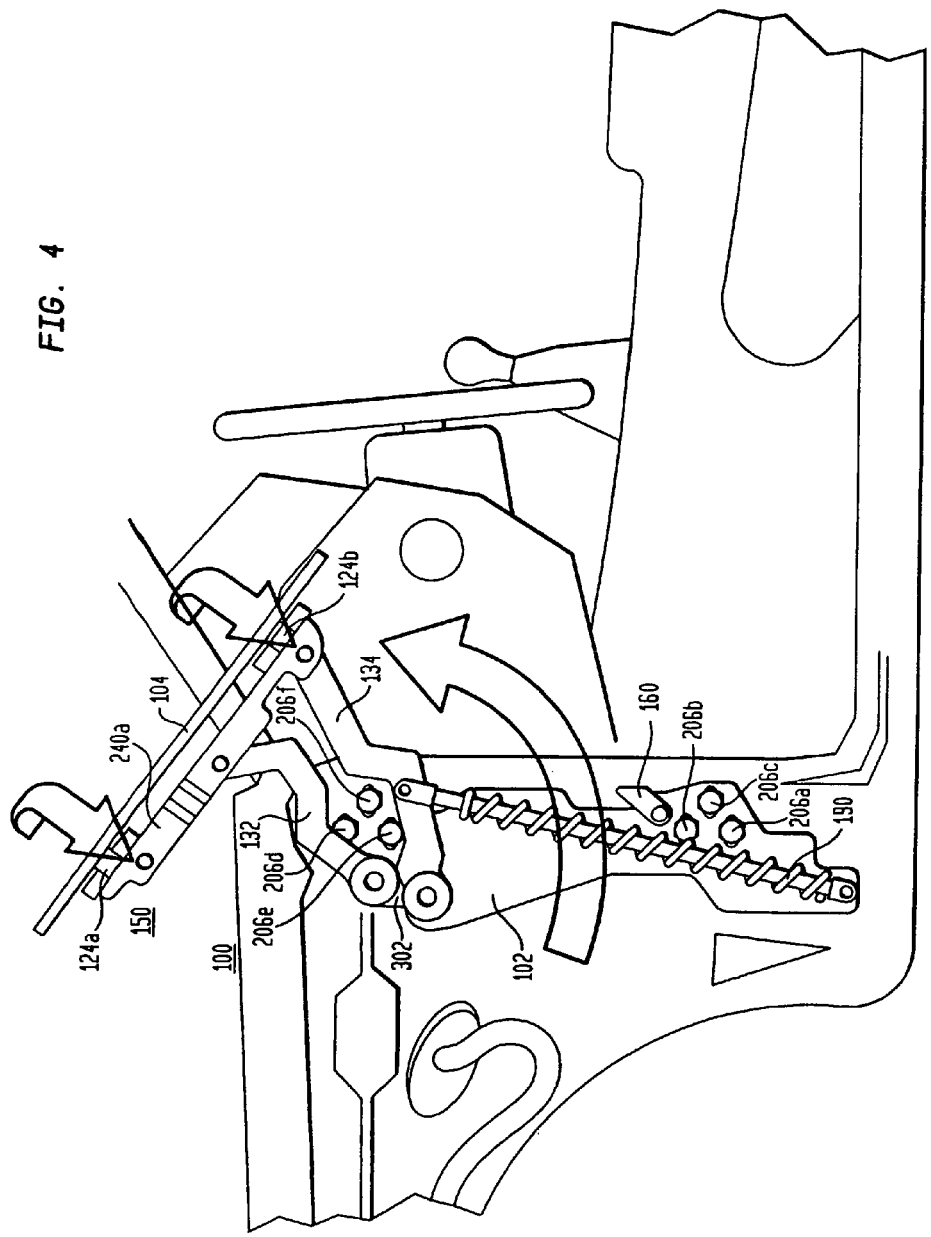
FIG. 4 is a planar front view of the invention in relation to a passenger vehicle when the side door is in an open position.

Referring generally to FIGS. 3-5, but particularly to FIGS. 5A-5D, a vehicle door 502 can be opened either horizontally or vertically using the apparatus 100 of the present invention. In order to open the door 502 horizontally, the stop pin assembly 228 is rotated to a position that provides door plate 104 with sufficient range of motion about hinges 124a and 124b that the door 502 can open horizontally. In a preferred embodiment, the stop pin assembly 228 is rotated inwardly toward hinge stabilizer bar 240b in order to allow the door plate 104 to rotate freely. This is seen most clearly in FIGS. 5C and 5D. Alternatively, the stop pin assembly 228 can be designed in such a manner that the stop pin assembly 228 must be rotated away from the door plate 104 in order to allow the door plate 104 to rotate freely.

With the stop pin assembly 228 rotated fully inwardly toward the hinge stabilizer bar 240b, the door is opened horizontally by applying outward (relative to the vehicle body) pressure to the back edge of the vehicle door. As outward pressure is applied to the back of the door, door plate 104 pivots about hinges 124a and 124b around hinge assembly 150 (see FIGS. 5C and 5D). The stop pin assembly 228 is rotated inwardly toward the hinge stabilizer bars 240a,b such that the stop pin assembly 228 does not obstruct the pivoting of the door plate 104 about hinges 124a,b. As a result, the leading edge of the vehicle door rotates inwardly toward the vehicle fender while the back edge of the door rotates out and away from the vehicle thereby creating an opening through which the vehicle interior can be accessed. The opening created by opening the door horizontally is equivalent to, or just slightly less than, the opening created when the door is opened horizontally about the OEM hinges.

In order to open the door vertically, the stop pin assembly 228 is positioned such that the stop pin assembly 228 inhibits the motion of the door plate 104 about the hinges 124a and 124b. As shown most clearly in FIGS. 5A and 5B, the stop pin assembly 228 can be rotated outwardly away from hinge stabilizer bar 240b such that the stop pin assembly 228 is at its maximum height relative to the hinge stabilizer 150. In this position, the stop pin assembly 228 allows the door plate 104 to pivot slightly, between about 0.25 inch to about 0.75 inch, about hinges 124a,b. At that point, the door plate 104 contacts the stop pin assembly 228 (see FIG. 5B). The stop pin assembly 228 thus prevents further horizontal rotation of the door about the hinges 124a and 124b. To complete opening the door vertically, upward pressure is applied to the door by the user. This upward pressure activates shock 190. Shock 190 expands and applies an upward force to lift arms 132 and 134. Lift arms 132 and 134 rotate synchronously through respective vertical arcs as bearing receiving members 236 and 242 rotate about pivot pins 210a and 210b. Once fully extended vertically, stop pin assembly 228 prevents the weight of the door from causing the door to rotate about hinges 124a and 124b.

In order to close the door from the vertically open position, downward pressure is applied to the door. As the door is being lowered, lift arm 134, and consequently the door itself, is guided through a proper plane and into position by pivot guide 160. Pivot guide 160 thus prevents the door from extending too far away from the vehicle body as the door is being closed from a vertical position.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention. Thus, the breadth and scope of the invention should not be limited by any of the above-described exemplary embodiments.

What is claimed is:

1. A method of opening a door connected to a passenger vehicle body, comprising the steps of:
 (a) rotating a stop pin assembly to a predetermined position depending upon whether the door is to be opened horizontally or vertically;
 (b) opening the door slightly horizontally; and
 (c) depending upon the positioning of the stop pin assembly in said step (a), either applying outwards pressure to a trailing edge of the door such that the door continues to open horizontally, or applying upwards pressure to the door such that the door opens vertically.

* * * * *